(12) United States Patent
Johnson et al.

(10) Patent No.: US 11,972,234 B2
(45) Date of Patent: Apr. 30, 2024

(54) MACHINE-LEARNED MODELS FOR GENERATING CODE SNIPPETS WITH PREDICTED PLACEHOLDERS FOR OPTIMIZING SOFTWARE DEVELOPMENT

(71) Applicant: Google LLC, Mountain View, CA (US)

(72) Inventors: Daniel Dun-Ning Woo Johnson, Toronto (CA); Daniel Stefan Tarlow, Montréal (CA); Maxim Tabachnyk, Munich (DE); Marc Hatcher Rasi, Sunnyvale, CA (US); Jacob Austin, New York, NY (US); Hassan Abolhassani, Palo Alto, CA (US); Jacob Hanson Hegna, Minneapolis, MN (US)

(73) Assignee: GOOGLE LLC, Mountain View, CA (US)

( * ) Notice: Subject to any disclaimer, the term of this patent is extended or adjusted under 35 U.S.C. 154(b) by 146 days.

(21) Appl. No.: 17/832,199

(22) Filed: Jun. 3, 2022

(65) Prior Publication Data
US 2023/0393817 A1      Dec. 7, 2023

(51) Int. Cl.
G06F 8/33      (2018.01)
(52) U.S. Cl.
CPC ..................... *G06F 8/33* (2013.01)
(58) Field of Classification Search
None
See application file for complete search history.

(56) References Cited

U.S. PATENT DOCUMENTS

| | | | | |
|---|---|---|---|---|
| 10,048,945 | B1 * | 8/2018 | Makkar | G06F 8/33 |
| 2019/0079753 | A1 * | 3/2019 | Makkar | G06F 8/36 |
| 2019/0079754 | A1 * | 3/2019 | Makkar | G06F 8/71 |
| 2019/0303108 | A1 * | 10/2019 | Fu | G06N 20/00 |
| 2020/0097261 | A1 * | 3/2020 | Smith | G06F 40/174 |
| 2020/0410390 | A1 * | 12/2020 | Fu | G06F 11/302 |
| 2021/0279042 | A1 * | 9/2021 | Allamanis | G06N 3/049 |
| 2022/0107802 | A1 * | 4/2022 | Rao | G06F 16/907 |

(Continued)

OTHER PUBLICATIONS

Chakraborty et al., "CODIT: Code Editing with Tree-Based Neural Models," IEEE, 2019, 14pg. (Year: 2019).*

(Continued)

*Primary Examiner* — Ryan D. Coyer
(74) *Attorney, Agent, or Firm* — DORITY & MANNING P.A.

(57) ABSTRACT

Systems and methods of the present disclosure are directed to a method for machine-learned code segment prediction for optimizing software development. The method includes obtaining an incomplete segment of code. The method includes processing the incomplete segment of code with a machine-learned code prediction model to obtain a sampled set of segment completion predictions that include code that completes the incomplete segment of code. The method includes determining an aggregated segment completion prediction from the sampled set of segment completion predictions. The method includes replacing a portion of the aggregated segment completion prediction with an input field, wherein the portion of the aggregated segment completion prediction is associated with a degree of certainty less than a threshold degree of certainty.

23 Claims, 7 Drawing Sheets

(56) References Cited

U.S. PATENT DOCUMENTS

2022/0374208 A1* 11/2022 Allamanis .............. G06N 3/045

OTHER PUBLICATIONS

Liu et al., "A Self-Attentional Neural Architecture for Code Completion with Multi-Task Learning," ACM, 2020, 11pg. (Year: 2020).*
Lu et al., "CodeXGLUE: A Machine Learning Benchmark Dataset for Code Understanding and Generation," arXiv, 2021, 14pg. (Year: 2021).*
Allamanis et al., "Mining Idioms from Source Code", arXiv:1404.0417v3, Jun. 2, 2014, 13 pages.
Guo et al., "Learning to Complete Code with Sketches", arXiv:2106.10158v2, Jan. 23, 2022, 23 pages.
Sontag et al., "Introduction to Dual Decomposition for Inference", 37 pages.
Visual Studio Code, "Snippets in Visual Studio Code", https://code.visualstudio.com/docs/editor/userdefinedsnippets, retrieved on Aug. 11, 2022, 7 pages.

* cited by examiner

MACHINE-LEARNED MODELS FOR GENERATING CODE SNIPPETS WITH PREDICTED PLACEHOLDERS FOR OPTIMIZING SOFTWARE DEVELOPMENT

FIELD

The present disclosure relates generally to code snippet prediction. More particularly, the present disclosure relates to generation of code snippet templates with predicted placeholder segments for optimizing software development.

BACKGROUND

Segment completion prediction is utilized within integrated development environments (IDEs) to increase the efficiency of software engineers (i.e., predicting code that completes a segment of code provided by a user). Conventionally, segment completion prediction techniques are limited to prediction of short snippets of code that immediately follow the code provided by an engineer, often within the same line of code. A main bottleneck to increasing the utility of these segment completion predictions is uncertainty related to aspects of the code provided by engineers, such as variable names, or the contents of a function. As such, techniques that can predict more complex segments of code are greatly desired.

SUMMARY

Aspects and advantages of embodiments of the present disclosure will be set forth in part in the following description, or can be learned from the description, or can be learned through practice of the embodiments. One example aspect of the present disclosure is directed to computer-implemented method for machine-learned code segment prediction. The method includes obtaining, by a computing system comprising one or more computing devices, an incomplete segment of code. The method includes processing, by the computing system, the incomplete segment of code with a machine-learned code prediction model to obtain a sampled set of segment completion predictions, wherein a segment completion prediction comprises code that completes the incomplete segment of code. The method includes determining, by the computing system, an aggregated segment completion prediction from the sampled set of segment completion predictions. The method includes replacing, by the computing system, a portion of the aggregated segment completion prediction with an input field, wherein the portion of the aggregated segment completion prediction is associated with a degree of certainty less than a threshold degree of certainty.

Another example aspect of the present disclosure is directed to a computing system for machine-learned code segment prediction. The computing system includes one or more processors. The computing system includes one or more non-transitory computer-readable media that store instructions that, when executed by the one or more processors, cause the computing system to perform operation. The operations include obtaining an incomplete segment of code. The operations include processing the incomplete segment of code with a machine-learned code prediction model to obtain a sampled set of segment completion predictions, wherein a segment completion prediction comprises code that completes the incomplete segment of code. The operations include determining an aggregated segment completion prediction from the sampled set of segment completion predictions. The operations include replacing a portion of the aggregated segment completion prediction with an input field, wherein the portion of the aggregated segment completion prediction is associated with a degree of certainty less than a threshold degree of certainty.

Another example aspect of the present disclosure is directed to one or more non-transitory computer-readable media that store instructions that, when executed by one or more processors, cause the computing system to perform operation. The operations include obtaining an incomplete segment of code. The operations include processing the incomplete segment of code with a machine-learned code prediction model to obtain a sampled set of segment completion predictions, wherein a segment completion prediction comprises code that completes the incomplete segment of code. The operations include determining an aggregated segment completion prediction from the sampled set of segment completion predictions. The operations include replacing a portion of the aggregated segment completion prediction with an input field, wherein the portion of the aggregated segment completion prediction is associated with a degree of certainty less than a threshold degree of certainty.

Another example aspect of the present disclosure is directed to a computer-implemented method for code segment prediction. The method includes obtaining, by a computing system comprising one or more computing devices, an incomplete segment of code. The method includes, based at least in part on the incomplete segment of code, obtaining, by the computing system, a sampled set of segment completion predictions, wherein a segment completion prediction comprises code that completes the incomplete segment of code. The method includes determining, by the computing system, an aggregated segment completion prediction from the sampled set of segment completion predictions. The method includes replacing, by the computing system, a portion of the aggregated segment completion prediction with an input field, wherein the portion of the aggregated segment completion prediction is associated with a degree of certainty less than a threshold degree of certainty.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
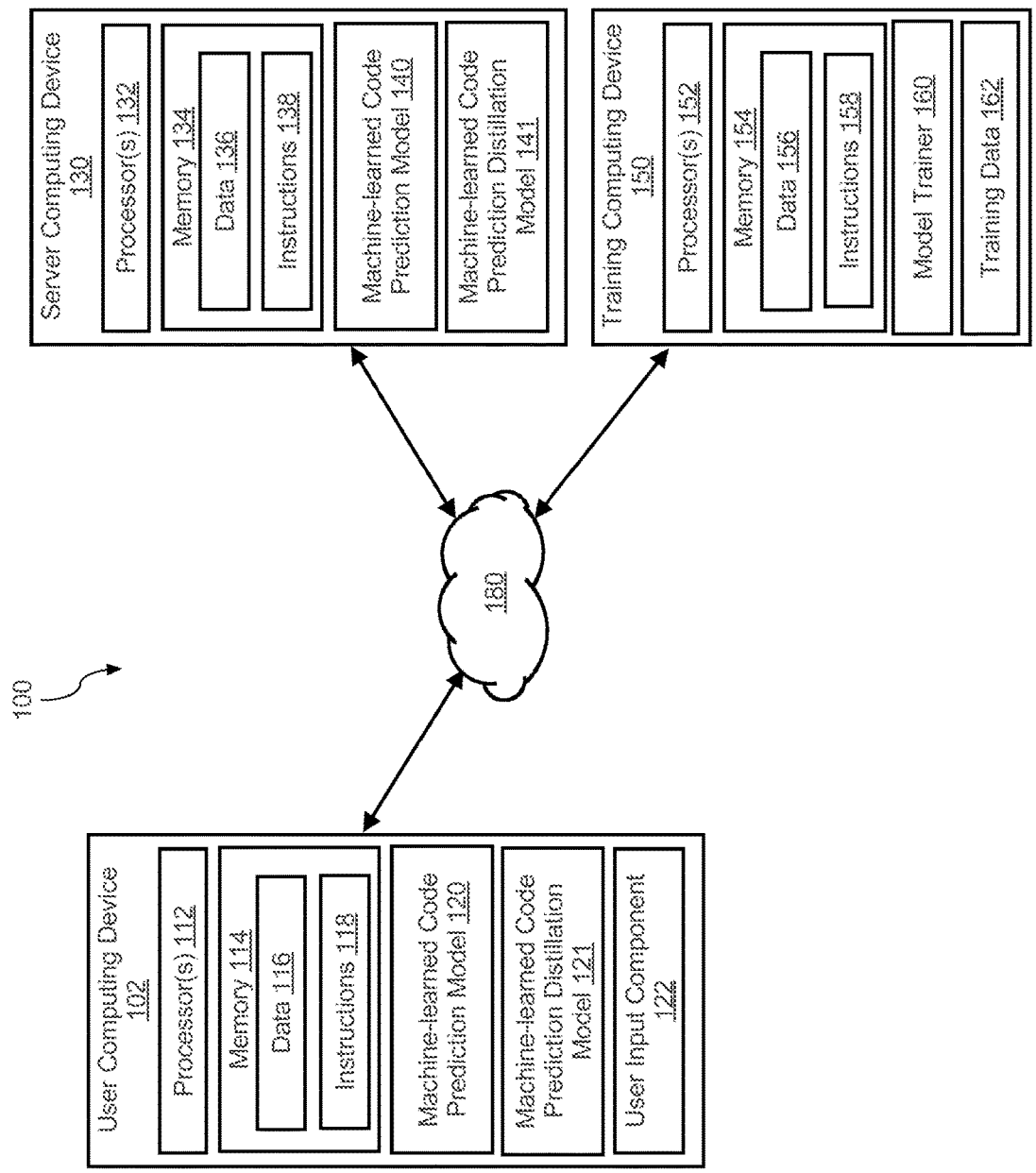
FIG. 1A depicts a block diagram of an example computing system that performs code snippet prediction according to example embodiments of the present disclosure.

Reference numerals that are repeated across plural figures are intended to identify the same features in various implementations.

DETAILED DESCRIPTION

Overview

Generally, the present disclosure is directed to code snippet prediction. More particularly, the present disclosure relates to generation of code snippet templates with predicted placeholder segments. As an example, an incomplete segment of code can be obtained (e.g., from the input of a user). This incomplete segment of code can be processed using a machine-learned code prediction model to obtain a sampled set of segment completion predictions. For example, each of the sampled set of segment completion predictions can include code that completes the incomplete segment of code.

An aggregated segment completion prediction can be determined from the sample set of segment completion predictions. Next, portion(s) of the aggregated segment completion prediction can be replaced with input field(s). The portion(s) of the aggregated segment completion prediction can be associated with a degree of certainty less than a threshold degree of certainty. For example, each of the set of segment completion predictions may include a predicted format of a function. However, each of the set of segment completion predictions may include different names for variables within the function. Accordingly, the portions of code corresponding to names for the variables within the function can be replaced with input fields, therefore allowing a user (e.g., an engineer) to quickly and efficiently generate a function while only having to enter the names of variables within the function.

Embodiments of the present disclosure present a number of technical effects and benefits. Specifically, implementation of a function or idea generally requires an engineer to write a substantial amount of supporting code (e.g., the syntactical structure of a loop or if statement, the content of a loop or if statement, etc.). For example, an engineer who has already determined the content of a segment of code must still spend a substantial amount of time and resources implementing the segment of code. However, embodiments of the present disclosure enable the generation and provision of segment completion predictions to reduce the amount of code that an engineer has to implement. In turn, the provision of segment completion predictions substantially reduces the time required to implement solutions or ideas in code, therefore increasing engineer efficiency and reducing computing resource usage by engineers (e.g., power usage, computing cycles, memory usage, storage, etc.).

It should be noted that code, or segments of code, can refer to any sort of instructions written using the protocol of a particular programming, markup, scripting, and/or styling language (e.g., HyperText Markup Language (HTML), C, C++, assembly code, Python, Lua, etc.). For example, a segment of code may refer to a portion of text written according to a programming language that collectively forms a set of instructions. For another example, a segment of code may be, or otherwise refer to, an abstraction of a segment of code (e.g., a visual scripting language, etc.). For yet another example, a segment of code may refer to a segment of assembly code. As such, it should be broadly understood that code, as described within the specification, may refer to any language or format interpretable by computing device(s) or application(s) executed by computing device(s) (e.g., compilers, interpreters, assemblers, integrated development environments, text editors, etc.).

With reference now to the Figures, example embodiments of the present disclosure will be discussed in further detail.

Example Devices and Systems

FIG. 1A depicts a block diagram of an example computing system 100 that performs code snippet prediction according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned code prediction models 120. For example, the machine-learned code prediction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned code prediction models 120 are discussed with reference to FIGS. 2-3.

In some implementations, the one or more machine-learned code prediction models 120 can be received from the server computing system 130 over network 180, stored in the user computing device memory 114, and then used or otherwise implemented by the one or more processors 112. In some implementations, the user computing device 102 can implement multiple parallel instances of a single machine-learned code prediction model 120 (e.g., to perform parallel code snippet prediction across multiple instances of the machine-learned code prediction model 120).

More particularly, the machine-learned code prediction model 120 can be utilized to generate code snippets that are predicted to complete an incomplete segment of code entered by a user. For example, a user can enter code into an integrated development environment (IDE) executed by processors 112 of the user device 102 via a user input component 122 (e.g., a keyboard, etc.). While the user is entering the code to the IDE, the current incomplete segment of code entered by the user can be processed with the machine-learned code prediction model 120 to obtain a sampled set of segment completion predictions. For example, the sampled set of segment completion predictions may each be or otherwise include a predicted segment of code that completes the incomplete segment of code entered by the user. The user computing device 102 can determine an aggregated segment completion prediction from the sampled set of completion predictions. For example, the set of sampled segment completion predictions may be aggregated to combine features that are common amongst the set of sampled segment completion predictions (e.g., above a threshold degree of certainty, etc.). The user computing device 102 can then replace a portion of the aggregated segment completion prediction that is associated with a degree of certainty less than a threshold degree of certainty with an input field. For example, each of the sampled set of segment completion predictions may include a different prediction for the portion of the aggregated segment completion prediction (e.g., a variable name, the contents of a loop, etc.), leading to a degree of certainty associated with the portion that is less than the threshold degree of certainty. This portion can be replaced with an input field to substantially increase user efficiency and decrease inefficiencies associated with incorrect code predictions.

It should be noted that the machine-learned code prediction model 120 can generate code predictions in a one-shot inference time procedure such that they can be presented to a user of the user computing device 102 in real-time. As an example, when the user computing device receives data that indicates a code prediction should be made, the machine-learned code prediction model 120 can first generate the sampled set of segment completion predictions (e.g., via a beam search, sampling, etc.). Next, the user computing devices can parse each of the sampled set of segment completion predictions to obtain their matchable tree representations. One of these tree representations can be selected by the user computing device as a prototype tree (e.g., a tree with a highest probability, a best prototype tree according to a cost function, etc.). The user computing device 102 can then run a search algorithm that treats all other trees from the sampled set of segment completion predictions as target trees. In such fashion, the user computing device, in conjunction with the machine-learned code prediction model 120, can determine a single (aggregated) segment completion prediction that is most useful, on average, across all of the sampled set of segment completion predictions. The aggregated tree can then be rendered to the aggregated segment completion prediction and presented to the user (e.g., within an integrated development environment).

In some implementations, user computing device 102 can include a machine-learned code prediction distillation model 121 trained, at least in part, using the machine-learned code prediction model 120 (e.g., via knowledge distillation training, etc.). For example, the machine-learned code prediction model 120 can be trained to generate a sampled set of segment completion predictions. The segment completion predictions can be aggregated as described previously, and a portion can be replaced with an input field. The machine-learned code prediction distillation model 121 can be trained based on the inputs to the machine-learned code prediction model and the aggregated segment completion prediction to accurately generate a single distilled segment completion prediction that includes one or more input fields.

Additionally or alternatively, one or more machine-learned code prediction models 140 can be included in or otherwise stored and implemented by the server computing system 130 that communicates with the user computing device 102 according to a client-server relationship. For example, the machine-learned code prediction models 140 can be implemented by the server computing system 140 as a portion of a web service (e.g., a code prediction service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned code prediction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned code prediction models 120 and/or 140 based on a set of training data 162. The training data 162 can include, for example, input data indicative of an incomplete segment of code and ground truth data indicative of a segment of code that completes the incomplete segment of code. Additionally, or alternatively, in some embodiments, the model trainer 160 can train a machine-learned code prediction distillation model to distill the knowledge of the machine-learned code prediction model 120. For example, the machine-learned code prediction distillation model can be trained by the model trainer 160 based on inputs to the machine-learned code prediction model and the aggregated segment completion prediction, as described previously.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
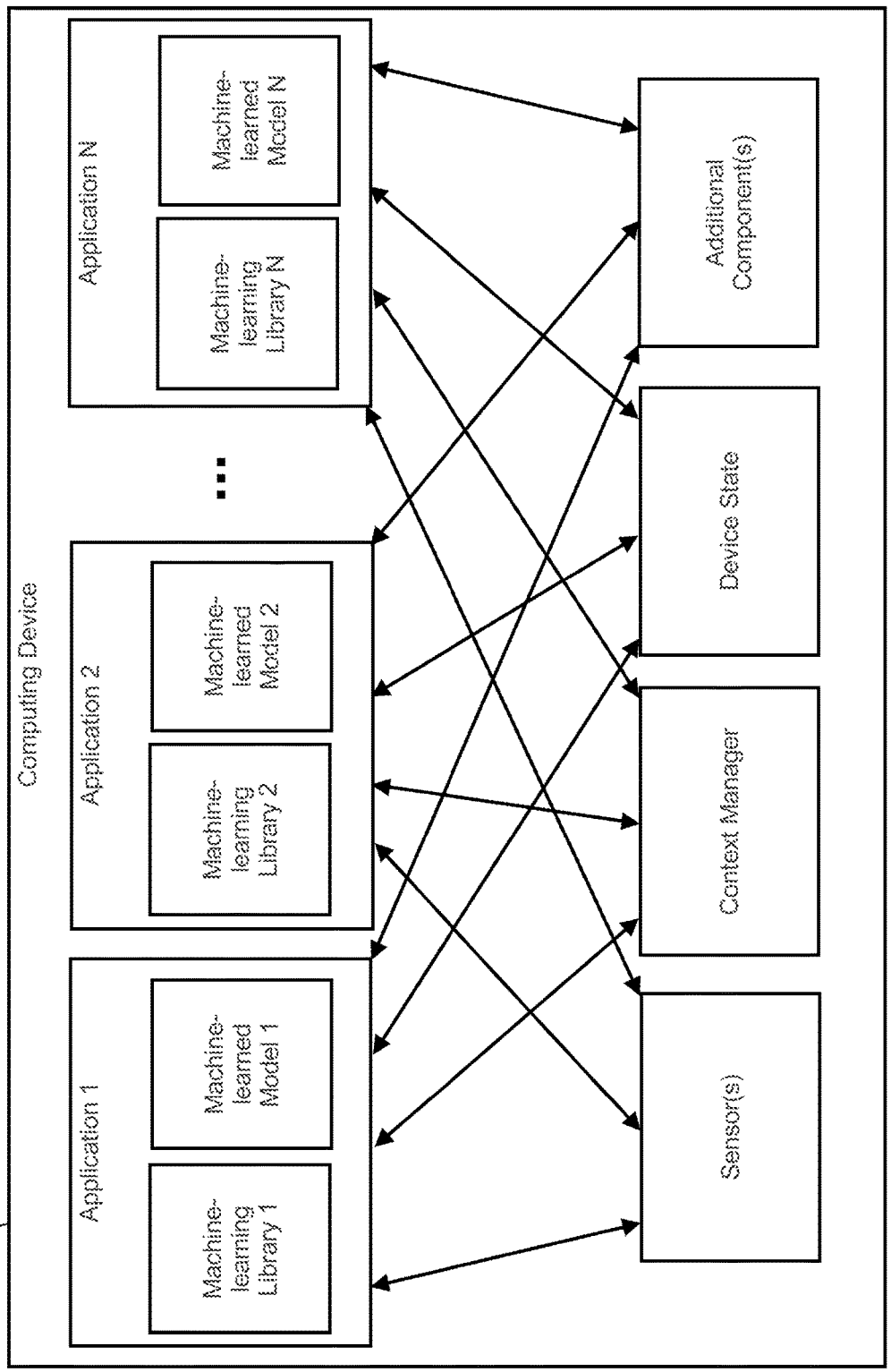
FIG. 1B depicts a block diagram of an example computing device that performs according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
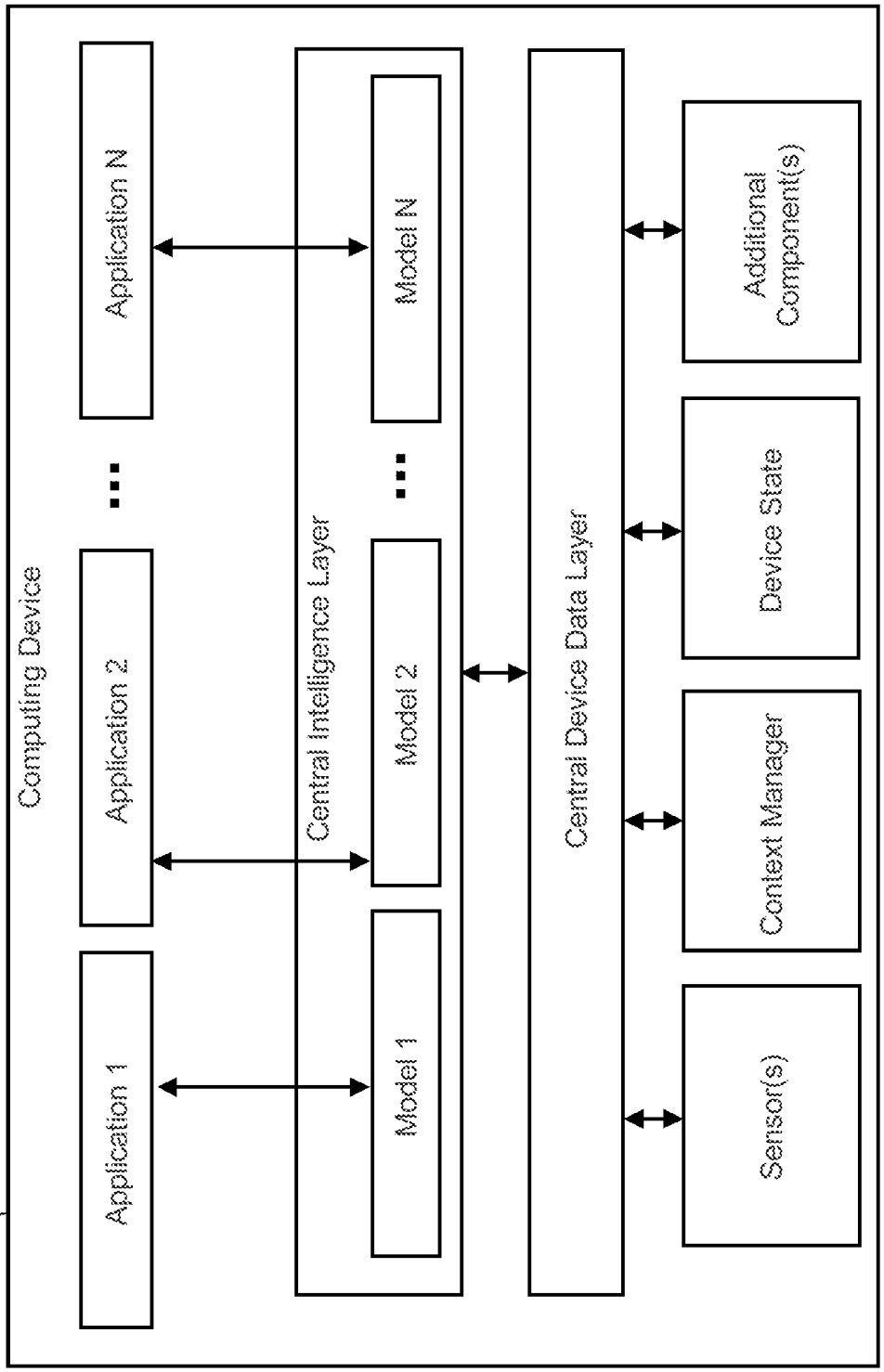
FIG. 1C depicts a block diagram of an example computing device that performs according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
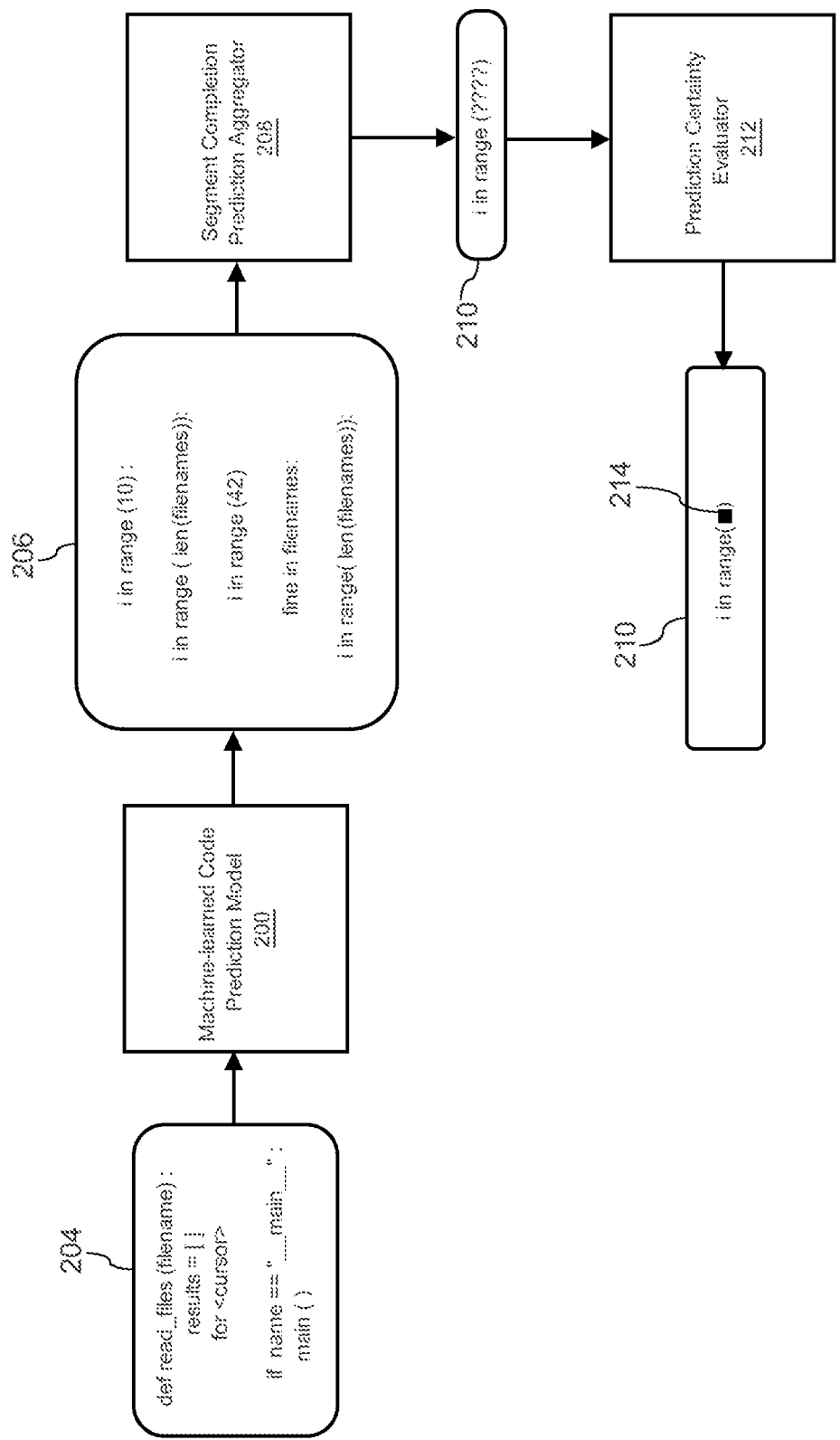
FIG. 2 depicts a block diagram of an example machine-learned code prediction model according to example embodiments of the present disclosure.

FIG. 2 depicts a block diagram of an example machine-learned code prediction model 200 according to example embodiments of the present disclosure. In some implementations, the machine-learned code prediction model 200 is trained to receive a set of input data descriptive of an incomplete segment of code 204 and, as a result of receipt of the incomplete segment of code 204, provide output data descriptive of a sampled set of segment completion predictions 206. For example, as depicted, the example incomplete segment of code 204 of FIG. 2 includes a read files function that has defined a results variable, and the user has currently left their cursor at the <cursor> location after starting to complete a segment of code for a for loop. As such, in some embodiments, a segment completion prediction that completes the incomplete segment of code 204 (e.g., a segment that completes the for loop) may be placed where the user has located their cursor.

The machine-learned code prediction model 200 can process the incomplete segment of code 204 to obtain the sampled set of segment completion predictions 206. As depicted, the sampled set of segment completion predictions 206 of FIG. 2 includes a set of differing predictions of segments that complete the incomplete segment of code 204. For example, four of the five sampled sets of segment completion predictions 206 predict "i in range(??):" to be included within the segment completion prediction, while only one segment completion prediction predicts "file in filenames" to be included within the segment completion prediction. Importantly, it should be noted that none of the four predictions that include "i in range (??):", have predicted the same value to be included within the parenthesis.

In some embodiments, the machine-learned code prediction model 200 may be or otherwise include a pre-trained generative model for generating code segments based on contextual information. For example, the machine-learned code prediction model 200 may process the content of a file of code that includes code entered so far by the user, and information indicating a current or last location of the users cursor. In some embodiments, the machine-learned code prediction model 200 may process this information to generate a probability distribution over code, represented as text, which can be utilized to sample the sampled set of segment completion predictions.

Additionally, or alternatively, in some embodiments, the machine-learned code prediction model 200 may be trained based on surrogate data. For example, the surrogate data may be generated by taking fully-written code files, deleting lines of those files, placing the cursor at that position, and then using the deleted code as the expected output of the machine-learned code prediction model 200, and training the machine-learned code prediction model 200 to assign high probability to this expected output. In some embodiments, the machine-learned code prediction model 200 may be or otherwise include a transformer-based language model.

The sampled set of segment completion predictions 206 can be aggregated by the segment completion prediction aggregator 208 to determine an aggregated segment completion prediction 210 from the sampled set of segment completion predictions 206.

In some embodiments, to aggregate the sampled set of segment completion predictions 206, the segment completion prediction aggregator 208 may utilize one or more algorithm(s). In some embodiments, the segment completion prediction aggregator 208 may first utilize a parsing algorithm (e.g., a parsing algorithm, a machine learned parsing model, etc.) to extract a relevant portion of code entered by a user (e.g., of an IDE, etc.) relevant to code prediction. For example, the segment completion prediction aggregator 208 may extract N lines of code positioned above the users cursor and N lines of code below the users cursor to represent a single logical subunit of the file of code.

Alternatively, in some embodiments, the segment completion prediction aggregator 208 can concatenate the extracted substring with each of the sampled set of segment completion predictions.

In some embodiments, the segment completion prediction aggregator 208 can utilize a parsing algorithm to parse each of the sampled set of segment completion predictions into a respective set of abstract syntax trees with annotations that specify which portions of the abstract syntax trees are replaceable. In some embodiments, the segment completion prediction aggregator 208 can traverse the parsed ASTs and inspect the (start offset, end offset) pair for each node of the AST to determine which part of the file and suggestion each node corresponds to. In some embodiments, the segment completion prediction aggregator 208 can determine which nodes in the AST can be replaced with an input field, and how they can match with other nodes in the AST.

As an example, the segment completion prediction aggregator 208 may evaluate whether the portion of the AST to be replaced by the input field has been input by the user. As another example, the segment completion prediction aggregator 208 may evaluate whether a node is relevant, or whether the node is a delimiter/punctuation symbol (e.g., replacing a node corresponding to a parenthesis with an input field is unlikely to increase user efficiency). As another example, the segment completion prediction aggregator 208 may determine whether child nodes can be combined in different positions. As another example, the segment completion prediction aggregator 208 may evaluate whether an AST node can be divided into multiple parts that can each be replaced with an input field. As another example, the segment completion prediction aggregator 208 may quantify a reduction in work for a user corresponding to replacement of a node with an input field (e.g., how useful it is to a user). As another example, the segment completion prediction aggregator 208 may evaluate whether a node can be combined with a different type of node.

In some embodiments, the segment completion prediction aggregator 208 may utilize a search algorithm to aggregate the parsed sampled set of segment completion predictions (e.g., a dynamic programming algorithm, etc.). For example, the segment completion prediction aggregator 208 may utilize a dynamic programming algorithm that based on aspects of a longest common subsequence algorithm and a graph shortest path algorithm.

In some embodiments, the segment completion aggregator 208 may first build a graph representing the local choice for matching the target tree with the prototype tree. These local choices can correspond to edges in the graph and can be specific to the particular target tree. Each local choice can be associated with a change in utility evaluated using a cost function. In some embodiments, local choices can be eliminated based on whether specific global decisions are made to eliminate or retain nodes within the graph. For example, choosing to match node T with node P may only be allowed if a global decision is made to keep node P. In some embodiments, there may be a path in the graph representative of a sequence of decisions in which the prototype is selected over the target graph at every branch.

In some embodiments, once the graph is established, the segment completion prediction aggregator 208 may perform a forward sweep through the graph using a dynamic programming algorithm to calculate a path associated with a best utility score, and then iterate back through the path to identify the solution. The segment completion prediction aggregator 208 can collect scores across all edges associated with each prototype decision to calculate rewards and penalties associated with each decision.

In some embodiments, the segment completion prediction aggregator 208 may next utilize a dual decomposition algorithm to process each tree and determine an aggregated syntax tree. Specifically, in some embodiments, the dual decomposition algorithm may process each tree in the following manner:
1. Start with zero penalties for each of the decisions, as there is no starting knowledge.
2. Process the first target tree.
    (a) Run the first component to extract the optimal cost and the new penalties. These new penalties can be treated as "votes" cast by this tree, about which specific nodes in the prototype to keep.
3. Process each subsequent tree.
    (a) Again, the first component can be utilized with each new target tree. However, the sum of all penalties from the previous trees can be used as input. In other words, the votes of previous trees can override the preferences of the current target tree, if the penalty is large enough.
4. Start over with the first target tree again, and iterate over all trees.
    (a) This time, every tree has already cast a vote, including this tree.
    (b) The old vote can be "removed" for this tree, so that only the votes for the other trees are used and thus the votes are not counted doubly.
    (c) The optimal cost and new votes can then be extracted.
    (d) The total utility being computing across all trees can be continuously computed.
5. Repeat step 4 until the total cost stops getting worse.
    (a) The total cost will get worse because, at the beginning, the prototype decisions were allowed to be different for the different target trees, but as the process continues, the penalties are used to trade costs between target trees. Eventually, all of the trees should agree, leading to pairwise scores that are worse.
6. Check to see if all of the trees agree on what the optimal prototype decisions are.
    (a) If so, the process is complete. Return the set of optimal decisions.
    (b) If the trees disagree, it may indicate that there was too much flexibility in the choices for the pairwise problem. In this scenario, the point of disagreement can be taken, and the original problem can be split into two smaller problems: one where that decision must always be true, and one where that decision must always be false.

Each time step 6b is reached, the problem can be split into two smaller problems. However, with each problem, a running lower bound can be established on the cost of the solution. In such fashion, the subproblem whose current lower bound is lowest can be favored, as that subproblem's cost will either increase (as indicated in step 5), or a solution is found.

In some embodiments, the above described process may be ended prematurely if the running time of the process exceeds a threshold amount of time. In this case, a solution can be determined by making choices using the current penalties that have been calculated, resolving disagreements between trees by making arbitrary choices.

The prediction certainty evaluator 212 can evaluate that a portion of the aggregated segment completion prediction 210 is associated with a degree of certainty less than a threshold degree of certainty. The prediction certainty evaluator 212 can then replace the portion with an input field that can be interacted with by a user to obtain the aggregated segment completion prediction 210 with an input field 214.

In some embodiments, the prediction certainty evaluator 212 may utilize a rendering algorithm to convert the best subtree of the prototype tree into an annotated snippet, which identifies the regions of the suggestion that should be put into portions of the aggregated segment completion prediction 210. Specifically, the prediction certainty evaluator 212 may iterate over each node in the AST determined by the segment completion prediction aggregator 208 to collect different logical components. For example, if the prediction certainty evaluator 212 determines that node in the tree (e.g., a portion of code) is associated with a degree of certainty higher than a threshold degree of certainty, code associated with the node can be included in the aggregated segment completion prediction 210. Conversely, if the prediction certainty evaluator 212 determines that node in the tree (e.g., a portion of code) is associated with a degree of certainty lower than a threshold degree of certainty, an input field 214 can be included in the aggregated segment completion prediction 210 in place of the portion of code associated with the node.

Figure 3:
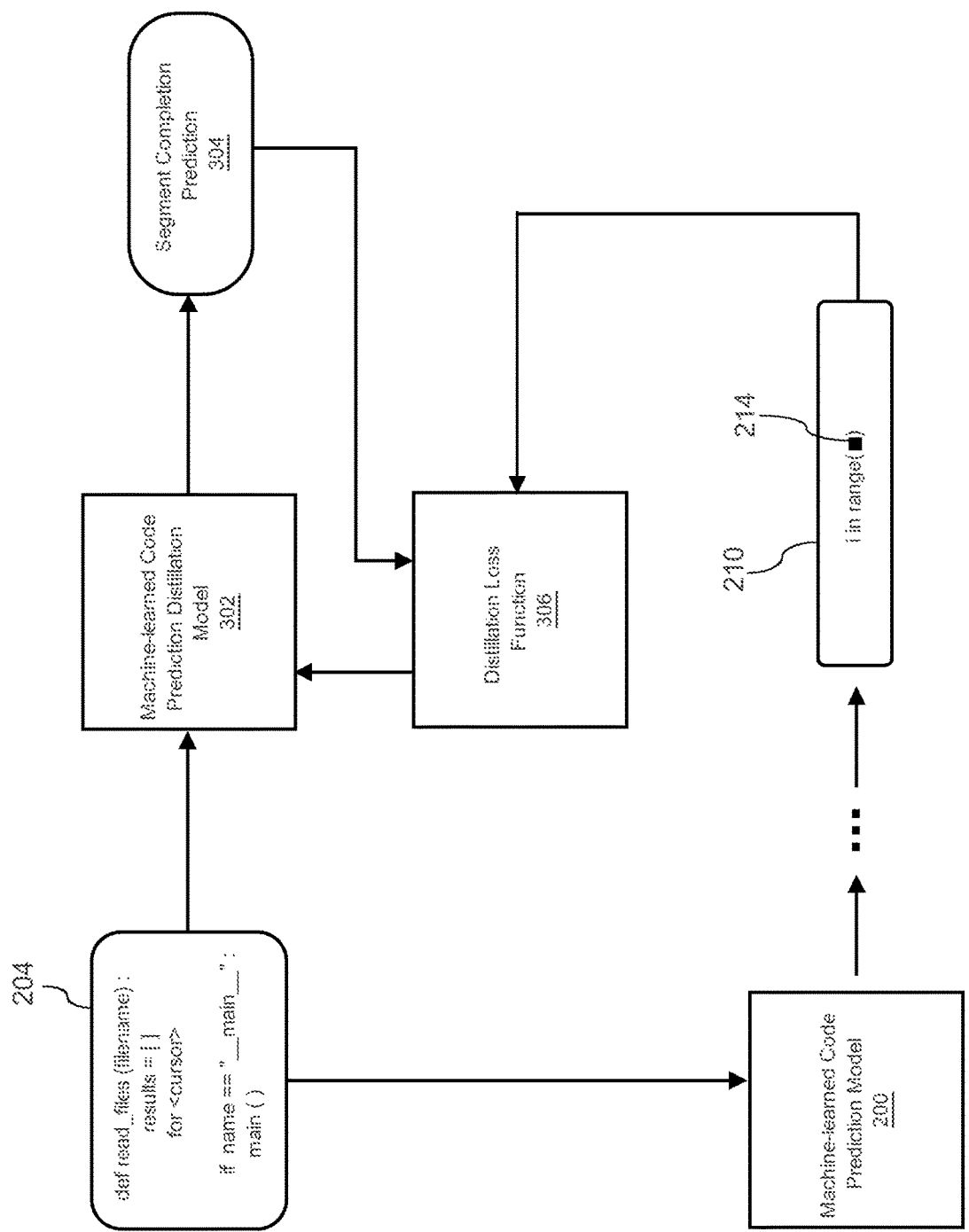
FIG. 3 depicts a data flow diagram for example distillation training of a machine-learned code prediction distillation model from the machine-learned code prediction model of FIG. 2 according to example embodiments of the present disclosure.

FIG. 3 depicts a data flow diagram for example distillation training of a machine-learned code prediction distillation model 302 from the machine-learned code prediction model 200 of FIG. 2 according to example embodiments of the present disclosure. Specifically, the machine-learned distillation model 302 can process the incomplete segment of code 204 of FIG. 2. Unlike the machine-learned code prediction model 200 of FIG. 2, which is trained to generate a sampled set of segment completion predictions, the machine-learned code prediction distillation model is trained to generate a single distilled segment completion prediction 304 that can include one or more input fields that replace one or more respective portions of the distilled segment completion prediction associated with a degree of certainty less than the threshold degree of certainty.

To train the machine-learned code prediction distillation model 302, the aggregated segment completion prediction and the input field 214 can be obtained using the machine-learned code prediction model 200 as described with regards to FIG. 2. The machine-learned code prediction distillation model 302 can process the same incomplete segment of code 204 to obtain a distilled segment completion prediction.

As an example, to perform knowledge distillation from the machine-learned code prediction model 200 to the machine-learned code prediction distillation model 302, the machine-learned code prediction model 200 can process the incomplete segment of code obtain a sampled set of segment completion predictions. The sampled set of segment completion predictions, and an associated ground truth segment completion snippet, can be parsed to ASTs as described previously. One of these trees can be a prototype tree and a subset of the remaining trees can be target trees. The search algorithm can be utilized to extract a snippet with optimal utility, and then rendered back into text using special text markers to distinguish placeholders.

The distillation loss function 306 can evaluate a difference between the aggregated segment completion prediction 210/214 and the distilled segment completion prediction 304, and based on the difference, can modify one or more values of one or more parameters of the machine-learned code prediction distillation model 302.

In such fashion, the machine-learned code prediction distillation model 302 can be trained to replace the two-step procedure of the machine-learned code prediction model illustrated in FIG. 2 with a single-call process to a single model. Specifically, distillation training of the machine-learned code prediction model enables much faster prediction of the distilled segment completion prediction 304, while also being as accurate or more accurate, than the process of FIG. 2, therefore leading to substantially reduced lag time between determination of the distilled segment completion prediction 304 and provision to the user within an IDE.

It should be noted that, in some embodiments, the machine-learned code prediction distillation model 302 can be trained to generate a different output format than that of the machine-learned code prediction model 200. Specifically, rather than being trained to map directly to what a user requested like the machine-learned code prediction model 200, the machine-learned code prediction distillation model can be trained to map from the incomplete segment of code to a rendered distilled segment completion prediction that includes placeholders (e.g., input fields 214), allowing for direct provision to the user.

In some embodiments, the machine-learned code prediction distillation model 302 may be evaluated (e.g., using a validation set of training data, etc.) to determine whether performance is above a threshold. Additionally, in some embodiments, user feedback can be utilized to further train the machine-learned code prediction distillation model 302.

Figure 4:
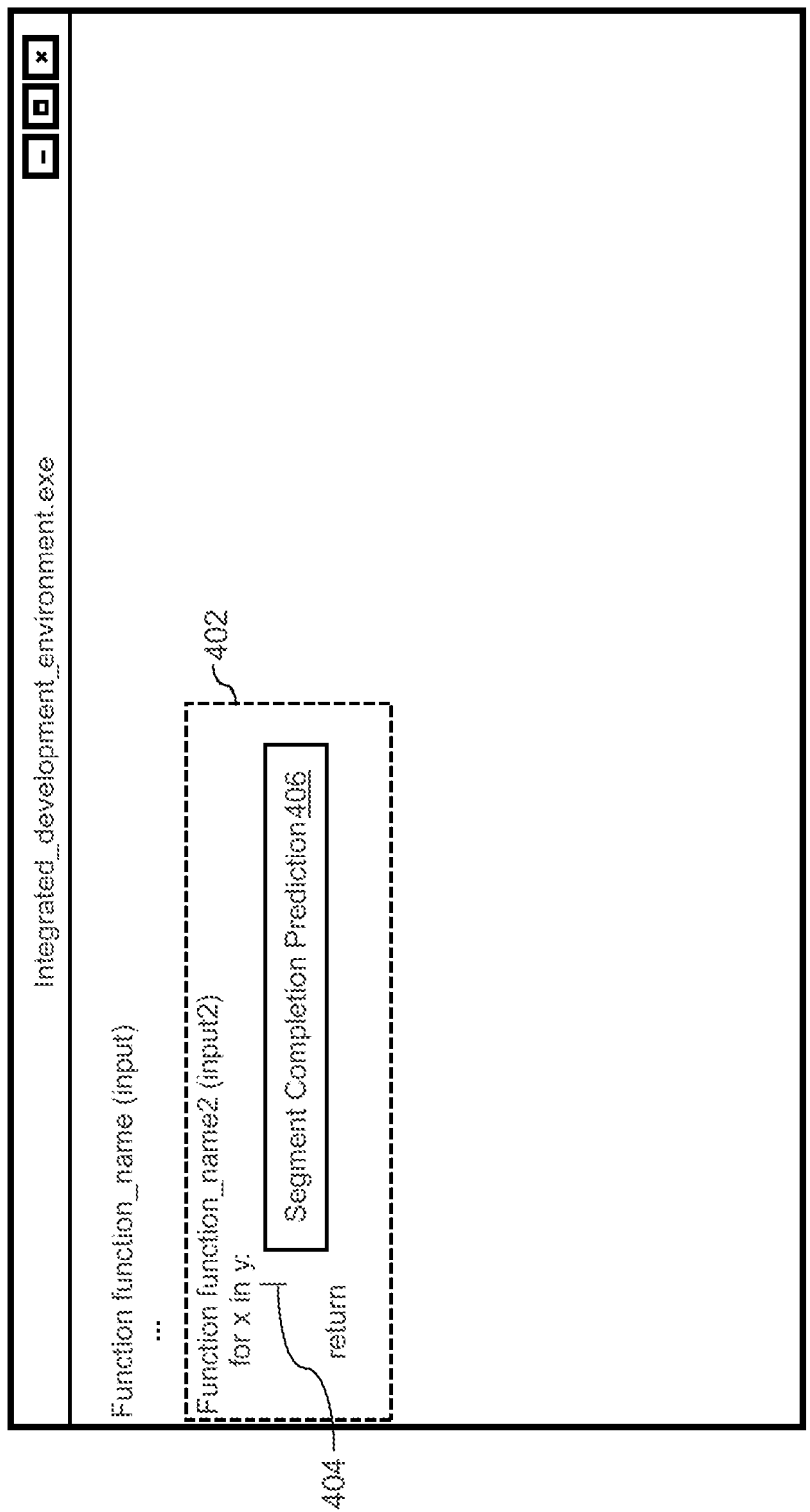
FIG. 4 illustrates an example user interface of an integrated development environment (IDE) utilizing a machine-learned code prediction model to provide code prediction to a user according to some embodiments of the present disclosure.

FIG. 4 illustrates an example user interface 400 of an integrated development environment (IDE) utilizing a machine-learned code prediction model to provide code prediction to a user according to some embodiments of the present disclosure. Specifically, the interface 400 depicts an incomplete segment of code 402 that a user has previously entered. Within the incomplete segment of code is the users cursor 404. The cursor 404 indicates a last stopping point for code entry for the user. Segment completion prediction 406 is a segment completion prediction generated using machine learned models of the present disclosure (e.g., the machine-learned code prediction model 200 of FIG. 2, the machine-learned code prediction distillation model 302 of FIG. 3, etc.).

Specifically, as illustrated, the incomplete segment of code 402 can include a function that includes a for loop. The user has last placed their cursor 404 within the for loop. The model of the present disclosure can process the incomplete segment of code 402 to obtain the segment completion prediction 406. The segment completion prediction 406 can be, or otherwise include, a predicted segment of code to include within the for loop (e.g., code to be included within the for loop in the incomplete segment of code 402). In such fashion, the segment completion prediction 406 can be provided to the user of the interface 400 to quickly and efficiently complete the incomplete segment of code 406.

Although FIG. 4 illustrates aspects of the present disclosure within an IDE, it should be noted that embodiments of the present disclosure are not limited to integrated development environments. Rather, embodiments of the present disclosure can be broadly utilized in any application in which code can be entered by a user. For example, embodiments of the present disclosure may be utilized within a text editing application. For another example, embodiments of the present disclosure may be utilized within an interactive application (e.g., a video game application that allows for in-application coding, an application that generates abstractions of code to simplify programming, etc.).

Example Methods

Figure 5:
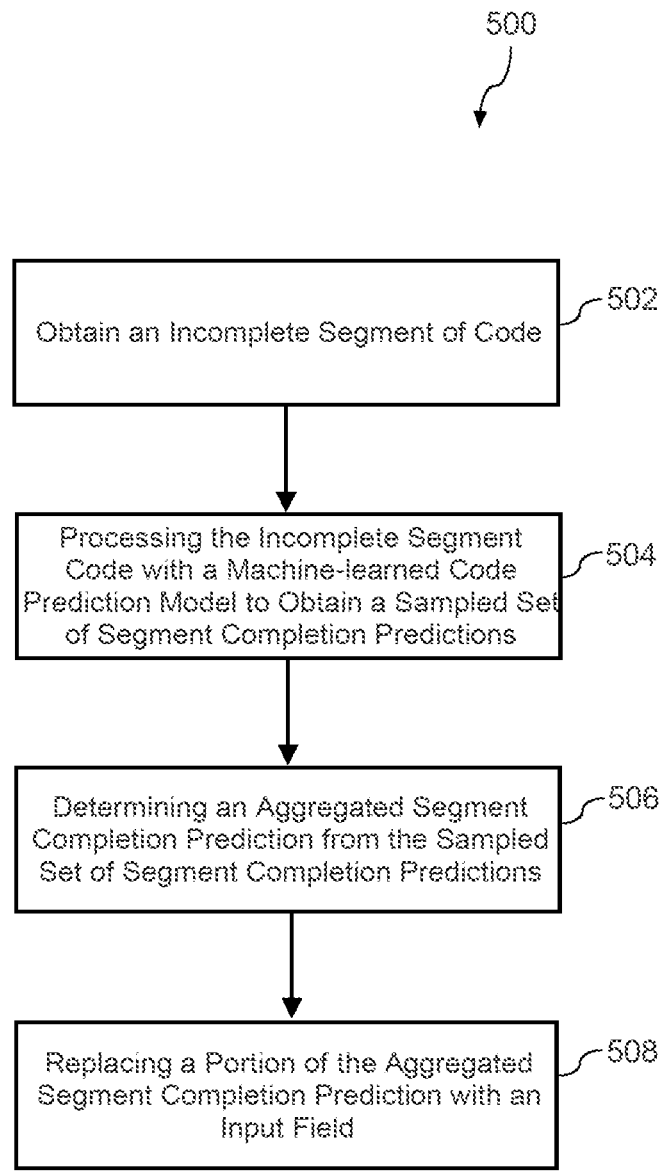
FIG. 5 depicts a flow chart diagram of an example method to perform machine-learned code prediction according to example embodiments of the present disclosure.

FIG. 5 depicts a flow chart diagram of an example method to perform machine-learned code prediction according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system obtains an incomplete segment of code. In some embodiments, the incomplete segment of code corresponds to a location of a cursor of a user within a development environment.

At 504, the computing system processes the incomplete segment of code with a machine-learned code prediction model to obtain a sampled set of segment completion predictions. More specifically, the computing system processes the incomplete segment of code with a machine-learned code prediction model to obtain a sampled set of segment completion predictions, wherein a segment completion prediction comprises code that completes the incomplete segment of code.

In some embodiments, to process the incomplete segment of code, the computing system parses the sampled set of code completion predictions to a respective set of abstract syntax trees, wherein each of the set of abstract syntax trees comprises annotations that indicate replaceable portions of the abstract syntax tree that are replaceable with input fields At 506, the computing system determines an aggregated segment completion prediction from the sampled set of segment completion predictions. More specifically, the computing system determines an aggregated segment completion prediction from the sampled set of segment completion predictions.

In some embodiments, to determine the aggregated segment completion prediction from the sampled set of segment completion predictions, the computing system evaluates a cost function that evaluates the replaceable portions of each of the set of abstract syntax trees to determine the aggregated segment completion prediction.

At 508, the computing system replaces a portion of the aggregated segment completion prediction with an input field. More specifically, the computing system replaces a portion of the aggregated segment completion prediction with an input field, wherein the portion of the aggregated segment completion prediction is associated with a degree of certainty less than a threshold degree of certainty. In some embodiments, the input field comprises a suggested portion of code that is selectable by a user.

In some embodiments, the computing system further evaluates a loss function that evaluates a difference between the aggregated segment completion prediction and a ground truth completion prediction, and modifies one or more values of one or more parameters of the machine-learned code prediction model based at least in part on the loss function.

In some embodiments, prior to replacing the one or more portions of the aggregated completion prediction, the computing system determines differences between the aggregated code completion prediction and one or more of the set of sample completion predictions, and, based at least in part on the differences, determines the degree of certainty for the portion of the aggregated completion prediction.

In some embodiments, the computing system provides the aggregated segment completion prediction to the user. In some embodiments, the computing system processes the incomplete segment of code with a machine-learned code prediction distillation model to obtain a distilled segment completion prediction. In some embodiments, the computing system evaluates a distillation loss function that evaluates a difference between the aggregated segment completion prediction and the distilled segment completion prediction, and modifies one or more values of one or more parameters of the machine-learned code prediction distillation model based at least in part on the distillation loss function.

In some embodiments, the computing system provides the distilled segment completion prediction to the user.

In some embodiments, the computing system may utilize the machine-learned code prediction model to determine and summarize the contents of a file of code. Specifically, the machine-learned code prediction model, as trained, may process a file of code to generate a summary for the file of code. In some embodiments, the summary for the file of code may highlight substantive segments of the file of code while removing, or ignoring, segments of the file of code considered to be boilerplate. Additionally, or alternatively, in some embodiments, the machine-learned code prediction model may be utilized, at least in part, to generate summarizations of substantive segments of the file of code.

For example, the machine-learned code prediction model may be utilized to select a section of existing code, either by letting the user choose or by using a heuristic to use a system to find similar sections of code in a large codebase. Next, the model can be utilized to combine the content of a current file of code along with the similar snippets found, producing a single template with placeholders. An extra cost may be added to the cost function to leverage the utility function for deviations of the template from the input code snippet (e.g., compared to retrieved code examples). In this fashion, the interface of an IDE may be used to visualize which parts of current snippet are common (i.e., part of template) and which parts are specific to the current file (i.e., not part of template).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for machine-learned code segment prediction for optimizing software development, comprising:
    obtaining, by a computing system comprising one or more computing devices, an incomplete segment of code;
    processing, by the computing system, the incomplete segment of code with a machine-learned code prediction model to obtain a sampled set of segment completion predictions, wherein a segment completion prediction comprises code that completes the incomplete segment of code;
    determining, by the computing system, an aggregated segment completion prediction from the sampled set of segment completion predictions; and
    replacing, by the computing system, a portion of the aggregated segment completion prediction with an input field, wherein the portion of the aggregated segment completion prediction is associated with a degree of certainty less than a threshold degree of certainty.

2. The method of claim 1, wherein the method further comprises:
    evaluating, by the computing system, a loss function that evaluates a difference between the aggregated segment completion prediction and a ground truth completion prediction; and
    modifying, by the computing system, one or more values of one or more parameters of the machine-learned code prediction model based at least in part on the loss function.

3. The method of claim 1, wherein the input field comprises a suggested portion of code that is selectable by a user.

4. The method of claim 1, wherein the incomplete segment of code corresponds to a location of a cursor of a user within a development environment.

5. The method of claim 1, wherein, prior to replacing the one or more portions of the aggregated completion prediction, the method comprises:
   determining, by the computing system, differences between the aggregated code completion prediction and one or more of the set of sample completion predictions; and based at least in part on the differences, determining, by the computing system, the degree of certainty for the portion of the aggregated completion prediction.

6. The method of claim 5, wherein processing the incomplete segment of code with the machine-learned code prediction model further comprises:
   parsing, by the computing system, the sampled set of code completion predictions to a respective set of abstract syntax trees, wherein each of the set of abstract syntax trees comprises annotations that indicate replaceable portions of the abstract syntax tree that are replaceable with input fields.

7. The method of claim 5, wherein determining the aggregated segment completion prediction from the sampled set of segment completion predictions comprises evaluating, by the computing system, a cost function that evaluates the replaceable portions of each of the set of abstract syntax trees to determine the aggregated segment completion prediction.

8. The method of claim 1, wherein the method further comprises: providing, by the computing system, the aggregated segment completion prediction to the user.

9. The method of claim 1, wherein the method further comprises:
   processing, by the computing system, the incomplete segment of code with a machine-learned code prediction distillation model to obtain a distilled segment completion prediction.

10. The method of claim 9, wherein the method further comprises evaluating, by the computing system, a distillation loss function that evaluates a difference between the aggregated segment completion prediction and the distilled segment completion prediction; and
    modifying, by the computing system, one or more values of one or more parameters of the machine-learned code prediction distillation model based at least in part on the distillation loss function.

11. The method of claim 9, wherein the method further comprises providing, by the computing system, the distilled segment completion prediction to the user.

12. A computing system for machine-learned code segment prediction for optimizing software development, comprising:
    one or more processors;
    one or more non-transitory computer-readable media that store instructions that, when executed by the one or more processors, cause the computing system to perform operations, the operations comprising:
    obtaining an incomplete segment of code;
    processing the incomplete segment of code with a machine-learned code prediction model to obtain a sampled set of segment completion predictions, wherein a segment completion prediction comprises code that completes the incomplete segment of code;
    determining an aggregated segment completion prediction from the sampled set of segment completion predictions; and
    replacing a portion of the aggregated segment completion prediction with an input field, wherein the portion of the aggregated segment completion prediction is associated with a degree of certainty less than a threshold degree of certainty.

13. The computing system of claim 12, wherein the input field comprises a suggested portion of code that is selectable by a user.

14. The computing system of claim 12, wherein the incomplete segment of code corresponds to a location of a cursor of a user within a development environment.

15. The computing system of claim 12, wherein, prior to replacing the one or more portions of the aggregated completion prediction, the operations comprise:
    determining differences between the aggregated code completion prediction and one or more of the set of sample completion predictions; and
    based at least in part on the differences, determining the degree of certainty for the portion of the aggregated completion prediction.

16. The computing system of claim 15, wherein processing the incomplete segment of code with the machine-learned code prediction model further comprises:
    parsing the sampled set of code completion predictions to a respective set of abstract syntax trees, wherein each of the set of abstract syntax trees comprises annotations that indicate replaceable portions of the abstract syntax tree that are replaceable with input fields.

17. The computing system of claim 15, wherein determining the aggregated segment completion prediction from the sampled set of segment completion predictions comprises evaluating a cost function that evaluates the replaceable portions of each of the set of abstract syntax trees to determine the aggregated segment completion prediction.

18. The computing system of claim 12, wherein the operations further comprise providing the aggregated segment completion prediction to the user.

19. The computing system of claim 12, wherein the method further comprises:
    processing, by the computing system, the incomplete segment of code with a machine-learned code prediction distillation model to obtain a distilled segment completion prediction.

20. One or more non-transitory computer-readable media that store instructions that, when executed by one or more processors, cause the computing system to perform operations, the operations comprising:
    obtaining an incomplete segment of code;
    processing the incomplete segment of code with a machine-learned code prediction model to obtain a sampled set of segment completion predictions, wherein a segment completion prediction comprises code that completes the incomplete segment of code;
    determining an aggregated segment completion prediction from the sampled set of segment completion predictions; and
    replacing a portion of the aggregated segment completion prediction with an input field, wherein the portion of the aggregated segment completion prediction is associated with a degree of certainty less than a threshold degree of certainty.

21. A computer-implemented method for code segment prediction, comprising:

obtaining, by a computing system comprising one or more computing devices, an incomplete segment of code;

based at least in part on the incomplete segment of code, obtaining, by the computing system, a sampled set of segment completion predictions, wherein a segment completion prediction comprises code that completes the incomplete segment of code;

determining, by the computing system, an aggregated segment completion prediction from the sampled set of segment completion predictions; and replacing, by the computing system, a portion of the aggregated segment completion prediction with an input field, wherein the portion of the aggregated segment completion prediction is associated with a degree of certainty less than a threshold degree of certainty.

22. The computer-implemented method of claim 21, wherein the sampled set of segment completion predictions are obtained based at least in part on a score assigned to each of the sampled set of completion predictions by a plurality of users.

23. The computer-implemented method of claim 21, wherein the sampled set of segment completion predictions are obtained using a machine-learned model.

\* \* \* \* \*